US010890104B2

(12) United States Patent
Kim

(10) Patent No.: US 10,890,104 B2
(45) **Date of Patent: *Jan. 12, 2021**

(54) CONTROL METHOD OF COOLING SYSTEM FOR VEHICLE

(71) Applicants: Hyundai Motor Company, Seoul (KR); Kia Motors Corporation, Seoul (KR)

(72) Inventor: Han Sang Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 157 days.

This patent is subject to a terminal disclaimer.

(21) Appl. No.: 16/167,044

(22) Filed: Oct. 22, 2018

(65) Prior Publication Data

US 2020/0040806 A1 Feb. 6, 2020

(30) Foreign Application Priority Data

Aug. 1, 2018 (KR) ........................ 10-2018-0089819

(51) Int. Cl.
*G05D 23/00* (2006.01)
*F01P 7/16* (2006.01)
(Continued)

(52) U.S. Cl.
CPC ............. *F01P 7/167* (2013.01); *F02M 26/24* (2016.02); *F02M 26/28* (2016.02); *F02M 26/30* (2016.02);
(Continued)

(58) Field of Classification Search
CPC .... F01P 7/167; F01P 2007/146; F02M 26/24; F02M 26/28; F02M 26/30; F02M 26/32; F02M 26/33
(Continued)

(56) References Cited

U.S. PATENT DOCUMENTS 4,785,874 A * 11/1988 Avrea .................. F01P 11/0238
123/41.51
5,561,243 A * 10/1996 Machida .................. F01P 5/14
123/41.12
(Continued)

FOREIGN PATENT DOCUMENTS

| | | | |
|---|---|---|---|
| JP | 4571897 | B2 | 10/2010 |
| JP | 2016-138513 | A | 8/2016 |
| KR | 10-2008-0027683 | A | 3/2008 |

OTHER PUBLICATIONS

JinYong Kim et al., "The Next Generation 1.6L Naturally Aspirated Gasoline Engine from Hyundai-Kia", 26th Aachen Colloquium Automobile and Engine Technology 2017, Oct. 11, 2017.

*Primary Examiner* — Claire E Rojohn, III
(74) *Attorney, Agent, or Firm* — Mintz Levin Cohn Ferris Glovsky and Popeo, P.C.; Peter F. Corless

(57) ABSTRACT

A method for controlling a cooling system for a vehicle is provided. The system includes an engine, an EGR cooler, an oil cooler, a heater, a radiator, and a controller. The engine, the EGR cooler, the oil cooler, the heater, and the radiator are respectively connected through a coolant line and coolant circulates through the engine, the EGR cooler, the oil cooler, the heater, and the radiator by operation of a water pump. The controller receives the coolant from the engine and operates a control valve connected with the oil cooler, the heater, and the radiator. The method includes: sensing driving conditions and operating the control valve when a cooling mode is required to decrease the temperature within the vehicle based on the sensed driving conditions. The control valve is operated based on modes controlled depending on a coolant temperature, and among the plurality of modes, one is iteratively performed.

18 Claims, 6 Drawing Sheets

(51) Int. Cl.
*F02M 26/32* (2016.01)
*F02M 26/30* (2016.01)
*F02M 26/24* (2016.01)
*F02M 26/28* (2016.01)
*F02M 26/33* (2016.01)
*F01P 7/14* (2006.01)

(52) U.S. Cl.
CPC ............ *F02M 26/32* (2016.02); *F02M 26/33* (2016.02); *F01P 2007/146* (2013.01)

(58) Field of Classification Search
USPC .......................................................... 165/300
See application file for complete search history.

(56) References Cited

U.S. PATENT DOCUMENTS 5,836,269 A * 11/1998 Schneider .............. F01P 11/029 123/41.1
6,032,618 A * 3/2000 Ferrari .................... F01P 7/164 123/406.55
6,109,219 A * 8/2000 Sano ....................... F01P 7/048 123/41.08
6,223,700 B1 * 5/2001 Sano ....................... F01P 7/167 123/41.1
6,340,006 B1 * 1/2002 Malatto ................... F01P 7/165 123/41.29
6,668,764 B1 * 12/2003 Henderson .............. F01P 7/167 123/41.1
7,267,084 B2 * 9/2007 Lutze ........................ F01P 3/20 123/41.02
7,467,605 B2 * 12/2008 Szalony ................... F01P 11/20 123/142.5 R
7,594,483 B2 * 9/2009 Tsuji ....................... F01P 7/165 123/41.1
8,181,610 B2 * 5/2012 Dipaola .................. F01P 7/165 123/41.1
8,291,870 B2 * 10/2012 Moffat ...................... F01P 3/12 123/41.05
8,474,419 B2 * 7/2013 De Andrade Filho ....................... F16K 31/402 123/41.8
10,180,090 B2 * 1/2019 Nakazono ............... F01P 7/167
10,371,041 B2 * 8/2019 Toyama .................. F01P 7/048
10,513,963 B2 * 12/2019 Koguchi ................... F01P 7/16
10,576,817 B2 * 3/2020 Battaglini ............ B62D 61/065
2001/0020452 A1 * 9/2001 Suzuki .................... F01P 7/164 123/41.1
2013/0167784 A1 * 7/2013 Quix ...................... F02M 26/33 123/41.1
2015/0176472 A1 * 6/2015 Hutchins ................. F01P 7/165 701/102
2016/0138530 A1 * 5/2016 Lee ........................ F02M 26/22 123/568.12
2016/0230708 A1 * 8/2016 Yang ...................... F02M 26/28
2017/0082008 A1 * 3/2017 Kim ....................... F02M 26/51
2017/0138320 A1 * 5/2017 Kim ....................... F02M 26/28
2017/0314484 A1 * 11/2017 Park .......................... F01P 3/20
2017/0314516 A1 * 11/2017 Kim ........................ F02B 47/08
2017/0314517 A1 * 11/2017 Kim ....................... F02M 26/04
2017/0335782 A1 * 11/2017 Kim .................... F02D 41/0007
2018/0156146 A1 * 6/2018 Kim ...................... F02D 41/068
2020/0040800 A1 * 2/2020 Kim ....................... F02M 26/28
2020/0040805 A1 * 2/2020 Kim ....................... F02M 26/32
2020/0040806 A1 * 2/2020 Kim ....................... F02M 26/24
2020/0063677 A1 * 2/2020 Kim ........................ F02D 21/08

* cited by examiner

CONTROL METHOD OF COOLING SYSTEM FOR VEHICLE

CROSS-REFERENCE TO RELATED APPLICATION

This application claims priority to and the benefit of Korean Patent Application No. 10-2018-0089819 filed on Aug. 1, 2018, the entire contents of which are incorporated herein by reference.

BACKGROUND

(a) Field of the Invention

The present invention relates to a method for controlling a cooling system for a vehicle, and more particularly, to a method for controlling a cooling system for a vehicle to improve fuel efficiency of the vehicle by adjusting coolant flow in a cooling mode that cools the interior of the vehicle.

(b) Description of the Related Art

In general, an engine exhausts heat energy while generating torque from combustion of fuel, and a coolant absorbs the heat energy while circulating through the engine, a heater, and a radiator, and emits the absorbed heat energy to the outside. When a coolant temperature of the engine is excessively high, knocking occurs, and thus ignition timing needs to be adjusted to suppress occurrence of knocking, thereby causing deterioration of engine performance. When a lubricant temperature is too high, viscosity becomes low, thereby causing deterioration of lubrication performance.

Further, when a coolant temperature of the engine is excessively low, oil viscosity is increased and thus frictional force is increased, fuel consumption is increased, a temperature of exhaust gas is slowly increased. Accordingly, the time to activate a catalyst is increased and quality of exhaust gas is deteriorated. In addition, time taken for normalizing the heater is increased, thereby causing inconvenience to a driver or an occupant within the vehicle. In particular, since viscosity of engine oil is increased when the engine is started in a cold condition such as a winter season, engine output and efficiency are deteriorated, thereby causing deterioration of fuel efficiency. Further, since incomplete combustion of fuel occurs when a temperature of the combustion chamber is low, exhaust gas may be excessively discharged.

Thus, since a single coolant control valve is applied to control several cooling elements, the temperature of the coolant in a particular portion is maintained to be high and the temperature of the coolant in another portion is maintained to be low. In other words, a technology for controlling each part of the coolant passing through a radiator, a heater core, an exhaust gas recirculation (EGR) cooler, an oil cooler, or a cylinder block using one coolant control valve unit has been researched, and a method for effectively controlling the control valve based on a mode of the vehicle has been researched.

The above information disclosed in this section is merely for enhancement of understanding of the background of the invention and therefore it may contain information that does not form the prior art that is already known in this country to a person of ordinary skill in the art.

SUMMARY

The present invention provides a method for controlling a vehicle cooling system to adjust a coolant flow by adjusting a control valve in a cooling mode for cooling the interior of the vehicle to thereby improve cooling efficiency and controllability.

According to an exemplary embodiment of the present invention, a method is provided for controlling a vehicle cooling system that includes an engine, an EGR cooler, an oil cooler, a heater, a radiator, and a controller, wherein the engine, the EGR cooler, the oil cooler, the heater, and the radiator are respectively connected via a coolant line and coolant circulates through the engine, the EGR cooler, the oil cooler, the heater, and the radiator by operation of a water pump, and the controller receives the coolant from the engine and adjusts a control valve that is connected with the oil cooler, the heater, and the radiator. In particular, the method may include: sensing driving conditions; and operating the control valve when a cooling mode is required to cool an interior of the vehicle among the sensed driving conditions, wherein the operating of the control valve includes a plurality of modes that are executed depending on a coolant temperature, and among the plurality of modes, one is iteratively performed.

In the mode that is iteratively performed among the plurality of modes, the coolant circulating by operation of the water pump may circulate to the EGR cooler without passing through the engine. Between the iteratively performed modes, one of modes that circulates the coolant to the oil cooler or the heater or to the oil cooler and the heater, excluding the radiator, may be performed. The control valve may include: a first connection line that receives a coolant from the engine and through which a coolant distributed to the oil cooler may flow; a second connection line through which a coolant distributed to the heater may flow; and a third connection line through which a coolant distributed to the radiator may flow, and the modes include a first mode to a fourth mode.

In the first mode, the first, second, and third connection lines may be blocked by operating the control valve, and a coolant circulating by operation of the water pump may be adjusted to pass through only the EGR cooler without passing through the engine. In the second mode, the first connection line may be opened and the second and third connection lines may be blocked by operating the control valve, and the coolant circulating by operation of the water pump may be adjusted to pass through the engine and the EGR cooler, and the coolant introduced to the control valve from the engine may be circulated to pass through the oil cooler through the first connection line.

In the third mode, the first, second, and third connection lines may be opened by operating the control valve, and the coolant circulating by the water pump may be adjusted to pass through the engine and the EGR cooler, and the coolant introduced into the control valve from the engine may be adjusted to pass through the oil cooler, the heater, and the radiator through the first, second, and third connection lines. In the fourth mode, the second connection line may be opened and the first and third connection lines may be closed by operating the control valve, and the coolant circulating by operation of the water pump may be adjusted to pass through the engine and the EGR cooler, and the coolant introduced into the control valve from the engine may be circulated to pass through the heater through the second connection line.

When the cooling mode starts, the controller may be configured to sequentially execute the first mode, the fourth mode, and the first mode. In the operating of the control valve, the first mode, the fourth mode, the first mode, the second mode, and the third mode may be executed sequentially. In the first mode, a coolant temperature may be increased to a second predetermined temperature. In the first mode that is performed again after the fourth mode, a coolant temperature may be increased to a third predetermined temperature. The fourth mode may be performed until a temperature of the coolant discharged from the EGR cooler reaches a fourth predetermined temperature. The second mode may be performed until a coolant temperature reaches a fifth predetermined temperature.

The operating of the control valve may be performed when an outdoor temperature is greater than a first predetermined temperature and a cooling fan is in a turned-on state. A coolant temperature may be increased to a second predetermined temperature in the first mode, the coolant temperature may be increased to a third predetermined temperature in the first mode that is performed again after the fourth mode, the fourth mode may be performed until a coolant temperature discharged from the EGR cooler reaches a fourth predetermined temperature, and the second mode may be performed until the coolant temperature reaches a fifth predetermined temperature. The second to fifth predetermined temperatures, excluding the fourth predetermined temperature, may be gradually increased from the second predetermined temperature to the fifth predetermined temperature.

As described above, the method for controlling the vehicle cooling system according to the exemplary embodiment of the present invention, a coolant flow may be adjusted by operating the control valve in the cooling mode to cool the interior of the vehicle to improve cooling performance. Additionally, fuel efficiency of the vehicle may be improved by effectively adjusting a coolant temperature. The present invention also minimizes the flow rate of the coolant circulating through the heater by blocking the flow of the high temperature coolant to the heater, thereby improving the cooling controllability, the overall merchantability of the vehicle, and the customer satisfaction. In addition, the present invention may optimize the flow rate of the coolant cooled through the radiator, and improve the cooling efficiency of the engine.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DESCRIPTION OF SYMBOLS

Figure 1:
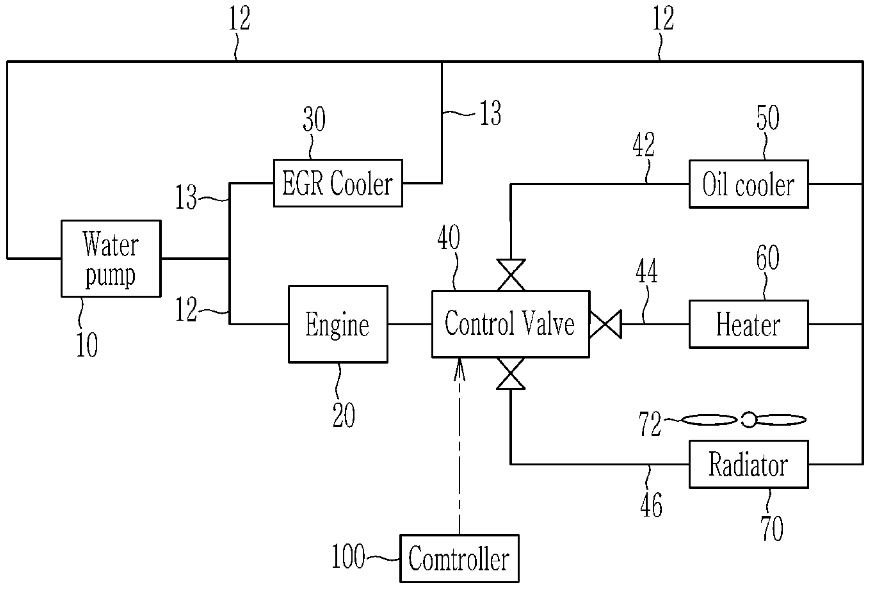
FIG. 1 is a schematic diagram of a cooling system for a vehicle, to which a method for controlling a vehicle cooling system according to an exemplary embodiment of the present invention is applied.

10: water pump
12: coolant line
13: EGR coolant line
20: engine
30: EGR cooler
40: control valve
42, 44, 46: first, second, and third connection lines
50: oil cooler
60: heater
70: radiator
72: cooling fan

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

An exemplary embodiment of the present invention will hereinafter be described in detail with reference to the accompanying drawings. Although exemplary embodiments have been described with reference to a number of illustrative embodiments thereof, it should be understood that numerous other modifications and exemplary embodiments may be devised by those skilled in the art that will fall within the spirit and scope of the principles of the present invention.

The drawings and description are to be regarded as illustrative in nature and not restrictive. Like reference numerals designate like elements throughout the specification. Since the size and the thickness of each configuration shown in the drawings are arbitrarily indicated for better understanding and ease of description, the present invention is not limited to shown drawings, and the thickness of layers, films, panels, regions, etc., are exaggerated for clarity.

FIG. 1 shows a cooling system for a vehicle, to which a control method of a vehicle cooling system according to an exemplary embodiment of the present invention is applied. Referring to FIG. 1, a vehicle cooling system according to an exemplary embodiment of the present invention may include an engine 20, an EGR cooler 30, an oil cooler 50, a heater 60, and a radiator 70. The engine 20, the EGR cooler 30, the oil cooler 50, the heater 60, and the radiator 60 may be respectively connected via a coolant line 12, and a coolant may be circulated therethrough through operation of a water pump 10.

The water pump 10 may be configured to pump a coolant to the engine 20 and the EGR cooler 30 through the coolant line 12. The pumped coolant may be distributed to the engine 20 and the EGR cooler 30. Particularly, the EGR cooler 30 may be connected with the coolant line 12 via an EGR coolant line 13 branched from the coolant line 12 to distribute the coolant discharged from the water pump 10 thereto. The EGR coolant line 13 may be passed through the EGR cooler 30 and then may be connected with the coolant line 12 again. Accordingly, the coolant pumped through operation of the water pump 10 may be selectively supplied to the engine 20 through the coolant line 12, and may always be supplied to the EGR cooler 30 through the EGR coolant line 13.

The cooling system may further include a control valve 40 disposed at a coolant outlet side of the engine 20 and the control valve 40 may be configured to receive a coolant discharged from the engine 10. The control valve 40 may be configured to operate according to a control signal of a controller 100. The controller 100 may be implemented as at least one microprocessor operated by a predetermined program which may include a series of commands for carrying out a method in accordance with an exemplary embodiment of the present invention.

The control valve 40 may be connected with the oil cooler 50, the heater 60, and the radiator 70 respectively via a first connection line 42, a second connection line 44, and a third connection line 46. A coolant distributed to the oil cooler 50 from the control valve 40 may flow through the first connection line 42. A coolant distributed to the heater 60 from the control valve 40 may flow through the second connection line 44. A coolant distributed to the radiator 70 from the control valve 40 may flow through the third connection line 46. In particular, the radiator 70 may be disposed at a front of the vehicle, and a cooling fan 72 may be provided at a rear side of the radiator 70.

The control valve 40 may be configured to selectively open and close the first, second, and third connection lines 42, 44, and 46, and adjust an opening rate of each of the first, second, and third connection lines 42, 44, and 46 based on a rotation position of a cap (not shown) provided therein. In other words, the control valve 40 may be operated by the controller 100 according to a driving condition of the vehicle and heating or cooling of the interior of the vehicle. Additionally, coolant discharged from the engine 20 may be circulated by being selectively supplied to the oil cooler 50, the heater 50, and the radiator 70 to thus adjust a coolant temperature.

Figure 2:
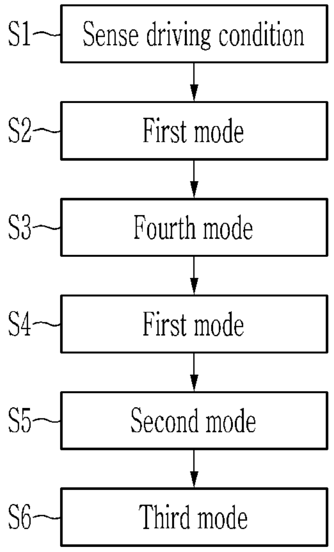
FIG. 2 is a flowchart of the control method of the vehicle cooling system according to the exemplary embodiment of the present invention.

FIG. 2 is a flowchart of a control method of the vehicle cooling system according to the exemplary embodiment of the present invention, and FIG. 3 to FIG. 6 are operation state views of a cooling system of each mode in the control method of the vehicle cooling system according to the exemplary embodiment of the present invention. Referring to FIG. 2, the controller 100 may be configured to sense a vehicle driving condition that includes a temperature of a coolant, a temperature of outdoor air, and the like (S1).

When a cooling mode is required according to the sensed driving condition, the controller 100 may be configured to operate the control valve 40. In particular, the control valve 40 maybe operated when an outdoor temperature is greater than a first predetermined temperature, and the cooling fan 72 is in a turn-on state. The first predetermined temperature may be greater than about 15° C. In addition, the control process of the control valve 40 includes a plurality of modes that are executed based on a coolant temperature, and one of the plurality of modes may be iteratively performed. In addition, among the modes, a coolant that circulates by operation of the water pump 10 may circulate to the EGR cooler 30 without passing through the engine 20 in the iteratively performed mode (e.g., one more may be repeated).

One of modes that circulates a coolant to the oil cooler 50, the heater 60, or the oil cooler 50 and the heater 60, excluding the radiator 70, may be executed between the iteratively performed modes. In other words, in the present exemplary embodiment, the control process may include first to fourth modes that are executed according to a coolant temperature, and the first mode among the first to fourth modes may be iteratively performed. In addition, when the cooling mode is started, the controller 100 may be configured to sequentially execute the first mode, the fourth mode, and the first mode.

Figure 3:
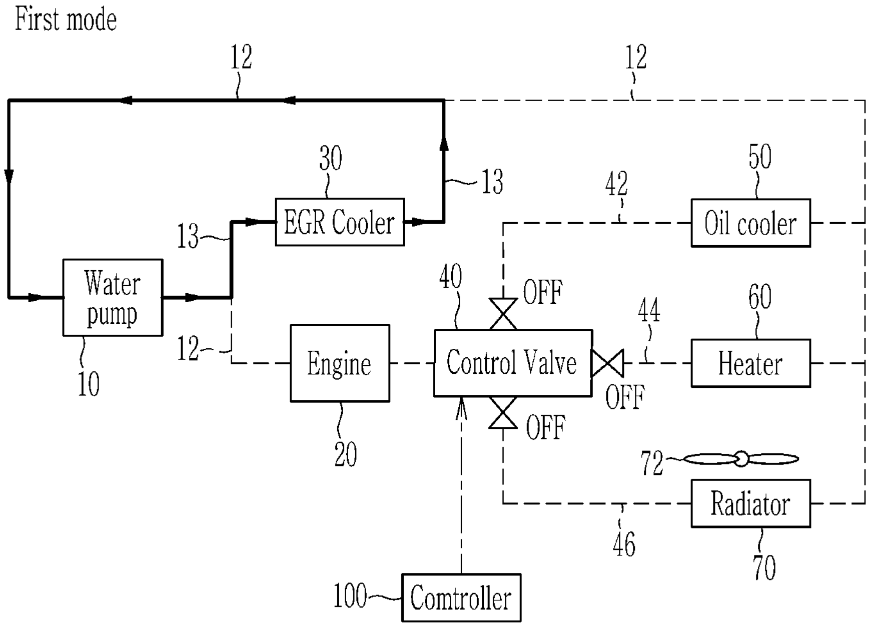
FIG. 3 to FIG. 6 are operation state views of the cooling system depending on each mode in the method for controlling the vehicle cooling system according to the exemplary embodiment of the present invention.

In the first mode, as shown in FIG. 3, the controller 100 may be configured to block the first, second, and third connection lines 42, 44, and 46 by operating the control valve 40, and circulates the coolant that circulates by operation of the water pump 10 to pass through the EGR cooler 30 through the EGR coolant line 13 without passing through the engine 20. In other words, in the first mode, the coolant does not flow to the engine 20 and thus minimizes the flow of the coolant to increase a temperature of engine oil and a temperature of the coolant in a low-temperature state.

Figure 4:
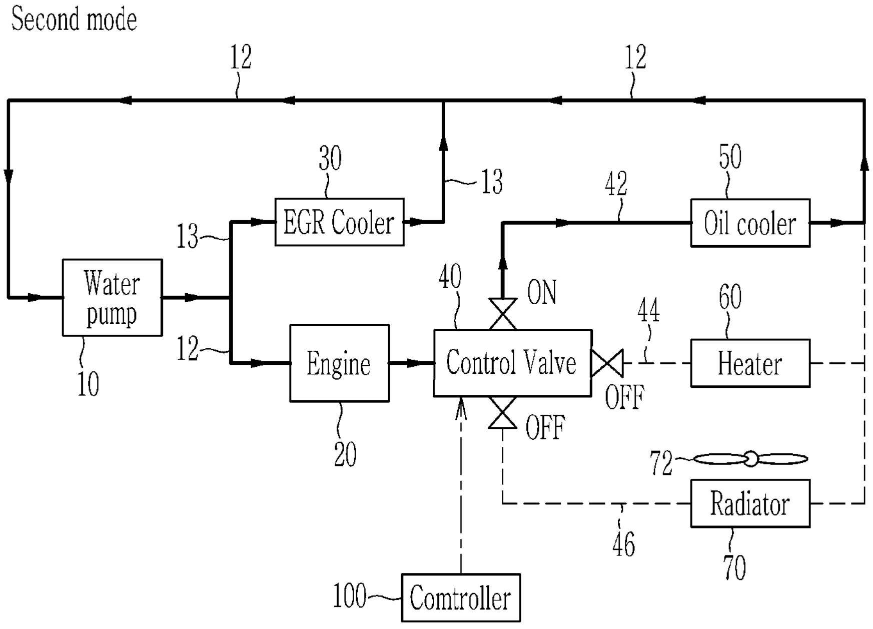

In the second mode, as shown in FIG. 4, the controller 100 may be configured to open the first connection line 42 and block the second and third connection lines 44 and 46 by operating the control valve 40. Thus, the coolant circulating by operation of the water pump 10 may pass through the engine 20 through the coolant line 12, and pass through the EGR cooler 30 through the EGR coolant line 13. In addition, a coolant introduced into the control valve 40 from the engine 20 may be passed through the oil cooler 50 through the first connection line 42, and then may circulate along the coolant line 12. In other words, the second mode is a section that is activated when the oil cooler 50 is used, and warm-up is performed.

Figure 5:
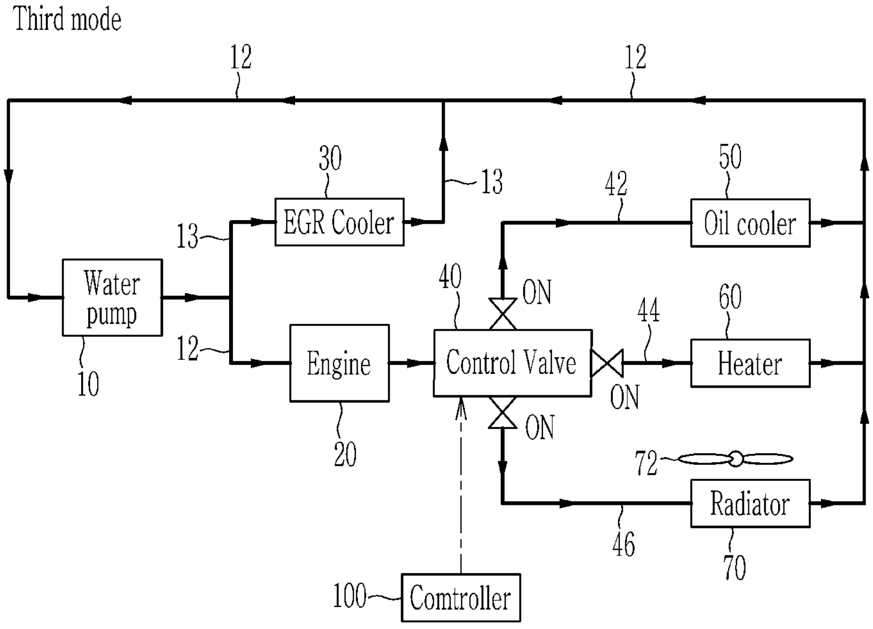

In the third mode, as shown in FIG. 5, the controller 100 may be configured to open the first, second, and third connection lines 42, 44, and 46 by operating the control valve 40, and may adjust the coolant circulating by operation of the water pump 10 to pass through the engine 20 and the EGR cooler 30. In addition, the coolant introduced to the control valve 40 from the engine 20 may be passed through the oil cooler 50, the heater 60, and the radiator 70 through the first, second, and third connection line 42, 44, and 46 and then may circulate along the coolant line 12. In other words, the third mode is a radiator cooling section, and thus may adjust a target temperature of the coolant by adjusting a cooling amount depending on a driving area of the engine 20.

Figure 6:
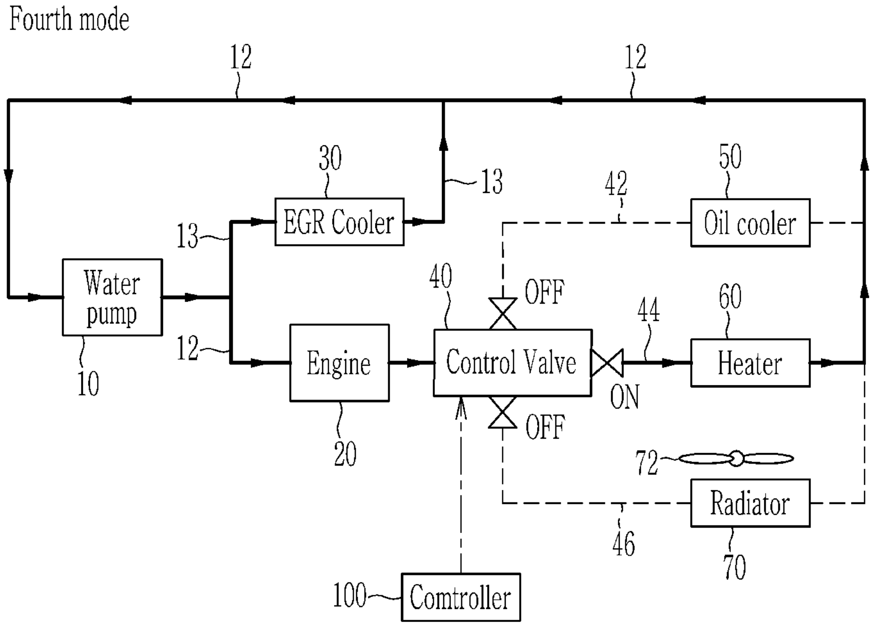

In addition, in the fourth mode, as shown in FIG. 6, the controller 100 may be configured to open the second connection line 44 and block the first and third connection line 42 and 46 by operating the control valve 40, and may adjust the coolant circulating by operation of the water pump 10 to pass through the engine 20 and the EGR cooler 30. In addition, the coolant introduced to the control valve 40 from the engine 20 may be passed through the heater 60 through the second connection line 44, and then may circulate along the coolant line 12. In other words, the fourth mode is a maximum heating section for optimized heating performance at an area where an outdoor temperature is low by circulating a temperature-increased coolant to the heater 50 while cooling the engine 20.

Meanwhile, in the present exemplary embodiment, the first, second, and third connection lines 42, 44, and 46 may be opened or closed in the first to fourth modes, but this is not restrictive. When the first, second, and third connection lines 42, 44, and 46 are opened, an opening degree of each of the first, second, and third connection lines 42, 44, and 46 may be adjusted to be a predetermined degree. In other words, a cam for adjusting an opening degree of each of the first, second, and third connection lines 42, 44, and 46 may be provided in the control valve 40, and the opening degree of the connection lines may be adjusted according to a rotation position of the cam.

Referring back to FIG. 2, the controller 100 may be configured to sense a driving condition of the vehicle (S1), and then the controller 100 may be configured to execute the first mode if the cooling mode that needs cooling of the interior of the vehicle is required (S2) (e.g., the interior temperature of the vehicle is to be decreased). In the first mode, the first, second, and third connection lines 42, 44, and 46 may all be closed, and accordingly, supply of the coolant to the oil cooler 50, the heater 60, and the radiator 70 may be stopped. The coolant in the coolant line 12 may be circulated by passing through only the EGR cooler 300 through the EGR coolant line 13 branched from the coolant line 12 without passing through the engine 20.

Accordingly, a temperature of the coolant may be increased through heat exchange with exhaust gas that is discharged from the engine 20 and may pass through the EGR cooler 30. In other words, when the cooling mode starts, the first mode started by the controller 100 becomes a primary flow stop section during which the coolant may flow only to the EGR cooler 30 without supplying the coolant to the engine 20. Particularly, in the first mode, the temperature of the coolant may be increased to a second predetermined temperature, and the second predetermined temperature may be set to be about 72° C. When the coolant temperature is increased to the second predetermined temperature, the controller 100 may be configured to execute the fourth mode (S3).

In the fourth mode, the coolant may be supplied to the heater 60 through the opened second connection line 44. Accordingly, the coolant in the coolant line 12 may pass through the engine 20 and the EGR cooler 30. In addition, the coolant introduced into the control valve 40 from the engine 20 may pass through the heater 60 through the second connection line 44 and then may circulate along the coolant line 12. Accordingly, the coolant temperature decreases to less than that in the first mode while passing through the heater 60. In other words, the controller 100 may be configured to execute the fourth mode until a temperature of the coolant discharged from the EGR cooler 30 reaches a fourth predetermined temperature. The fourth temperature may be set to be about 60° C.

When the temperature of the coolant discharged from the EGR cooler 30 reaches about 60° C., the controller 100 may be configured to repeat execution of the first mode to minimize a flow of the coolant (S4). In particular, the controller 100 may be configured to increase the coolant temperature to a third predetermined temperature in the first mode that is repeated after the fourth mode. The third predetermined temperature may be set to be about 76.5° C. In other words, the repeated first mode after the fourth mode is a secondary flow stop section of the coolant during which the coolant may be adjusted to flow only to the EGR cooler 30 without supplying the coolant to the engine 20.

Since the flow of the coolant is secondarily stopped as stated above, performance of the EGR cooler 30 may be assured, and at the same time the coolant may be promptly heated to reach a higher temperature. When the coolant temperature is increased to the third predetermined temperature, the controller 100 may be configured to execute the second mode (S5). In the second mode, the coolant may be supplied to the oil cooler 50 through the opened first connection line 42. Accordingly, the coolant in the coolant line 12 may pass through the engine 20 and the EGR cooler 30. In addition, the coolant introduced into the control valve 40 from the engine 20 may pass through the oil cooler 50 through the first connection line 42, and then may circulate along the coolant line 12.

The coolant of which the temperature is increased to the third predetermined temperature warms the oil cooler 50 while the second mode is performed. In particular, the controller 100 may be configured to execute the second mode until the temperature of the coolant reaches a fifth predetermined temperature. The fifth predetermined temperature may be set to be about 97° C. In other words, when the coolant temperature reaches about 97° C., the controller 100 may be configured to execute the third mode (S6).

In the third mode, the coolant discharged from the engine 20 may be supplied to the oil cooler 50, the heater 60, and the radiator 70 through the opened first, second, and third connection lines 42, 44, and 46. Accordingly, the coolant in the coolant line 12 may pass through the engine 20, and at the same time, may pass through the EGR cooler 30 through the EGR coolant line 13. In addition, the coolant introduced into the control valve 40 from the engine 20 may pass through the oil cooler 50, the heater 60, and the radiator 70 through the first, second, and third connection lines 42, 44, and 46, and then may circulate along the coolant line 12.

In the present exemplary embodiment, the controller 100 may be configured to open the third connection line 46 connected with the radiator 70 when the coolant temperature reaches the fifth predetermined temperature (i.e., about 97° C.), and thus a temperature of the coolant may be decreased to a target temperature by adjusting a cooling amount based on a driving area of the engine 20. Particularly, temperatures from the second to fifth predetermined temperatures, excluding the fourth predetermined temperature, may be gradually increased. In other words, when the interior of the vehicle needs to be cooled (e.g., the interior temperature is to be decreased), the controller 100 may be configured to sequentially perform the first mode, the fourth mode, the first mode, the second mode, and the third mode through the above-described process.

Meanwhile, in the present exemplary embodiment, the first mode may be iteratively performed (e.g., repeated) and the fourth mode may be performed between the first modes and thus, the coolant heated while passing through the engine 20 may flow through the coolant line 12, but this may be determined based on heat capacity of the oil cooler 50 and the heater 60 and thus is not restrictive. In other words, instead of performing the fourth mode between the iteratively performed first modes, the second mode during which the coolant flows only to the oil cooler 50 or the third mode during which the coolant flows only to the oil cooler 50 and the heater 60 may be performed. In addition, the first mode, which is a flow stop section for minimizing coolant flow, may be iteratively performed, and accordingly, a coolant flow in the cooling mode may be more effectively controlled.

Meanwhile, in the present exemplary embodiment, the heater 60 prevents supply of a high temperature coolant to improve the cooling performance of the interior of the vehicle, but the present invention is not limited thereto. In the cooling mode, when the humidity is generated by the temperature difference between the exterior and the interior of the vehicle, the controller 100 may be configured to supply a high temperature coolant to the heater 60 through the operation control of the control valve 40 to dehumidify the vehicle interior.

In other words, when dehumidifying the vehicle interior in the third mode, the controller 100 may be configured to adjust an opening rate of the second and third connection lines 44 and 46 to adjust the flow rate of the coolant supplied to the heater 60 and the radiator 70 connected via the control valve 40 and the second and third connection lines 44 and 46. For example, when dehumidifying the interior of the vehicle, the controller 100 may be configured to adjust the opening rate of the third connection line 46 to the minimum to ensure that the high temperature coolant is maximally supplied to the heater 60, and may be configured to adjust the opening rate of the second connection line 44 to be increased.

Thus, when the method for controlling the vehicle cooling system according to the above-described exemplary embodiment is applied, a coolant flow may be adjusted by operating the control valve 40 in the cooling mode for cooling the interior of the vehicle. Thus, cooling performance may be improved and fuel efficiency of the vehicle may be improved by effectively adjusting a coolant temperature. In addition, the present invention minimizes the flow rate of the coolant circulating through the heater 60 by blocking the flow of the high temperature coolant to the heater 60, thereby improving the cooling controllability, the overall merchantability of the vehicle, and the customer satisfaction. The present invention may also optimize the flow rate of the coolant cooled through the radiator 70 and improve the cooling efficiency of the engine 20.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method for controlling a vehicle cooling system that includes an engine, an exhaust gas recirculation (EGR) cooler, an oil cooler, a heater, a radiator, and a controller, wherein the engine, the EGR cooler, the oil cooler, the heater, and the radiator are respectively connected through a coolant line and coolant circulates through the engine, the EGR cooler, the oil cooler, the heater, and the radiator by operation of a water pump, and the controller for controlling a control valve that receives the coolant from the engine and is connected to the oil cooler, the heater, and the radiator, respectively, the method comprising:

sensing, by the controller, a plurality of driving conditions; and operating, by the controller, the control valve when a cooling mode is required to decrease a temperature within the vehicle based on the sensed driving conditions, wherein the control valve is operated based on a plurality of modes that are adjusted depending on a coolant temperature, wherein one of the plurality of modes is iteratively performed, and wherein in the mode that is iteratively performed, the coolant circulating by operation of the water pump circulated to the EGR cooler without passing through the engine.

2. The method for controlling the vehicle cooling system of claim 1, wherein, between the iteratively performed modes, one of modes that circulates the coolant to the oil cooler or the heater or to the oil cooler and the heater, excluding the radiator, is performed.

3. The method for controlling the vehicle cooling system of claim 1, wherein the control valve includes:

a first connection line that receives a coolant from the engine and through which a coolant distributed to the oil cooler flows;

a second connection line through which a coolant distributed to the heater flows; and a third connection line through which a coolant distributed to the radiator flows, wherein the plurality of modes include a first mode, a second mode, a third mode, and a fourth mode.

4. The method for controlling the vehicle cooling system of claim 3, wherein, in the first mode, the method includes:

blocking, by the controller, the first, second, and third connection lines by operating the control valve; and operating, by the controller, the water pump to circulate a coolant through only the EGR cooler without passing through the engine.

5. The method for controlling the vehicle cooling system of claim 3, wherein, in the second mode, the method includes:

opening, by the controller, the first connection line and blocking the second and third connection lines by operating the control valve; and operating, by the controller, the water pump to circulate the coolant through the engine and the EGR cooler, and to circulate the coolant introduced to the control valve from the engine through the oil cooler through the first connection line.

6. The method for controlling the vehicle cooling system of claim 3, wherein, in the third mode, the method includes:

opening, by the controller, the first, second, and third connection lines by operating the control valve; and operating, by the controller, the water pump to circulate the coolant through the engine and the EGR cooler, and to circulate the coolant introduced into the control valve from the engine through the oil cooler, the heater, and the radiator through the first, second, and third connection lines.

7. The method for controlling the vehicle cooling system of claim 3, wherein, in the fourth mode, the method includes:

opening, by the controller, the second connection line and closing the first and third connection lines by operating the control valve; and operating, by the controller, the water pump to circulate the coolant through the engine and the EGR cooler, and to circulate the coolant introduced into the control valve from the engine through the heater through the second connection line.

8. The method for controlling the vehicle cooling system of claim 3, wherein, when the cooling mode starts, the controller is configured to sequentially perform the first mode, the fourth mode, and the first mode.

9. The method for controlling the vehicle cooling system of claim 3, wherein, in the operation of the control valve, the first mode, the fourth mode, the first mode, the second mode, and the third mode are sequentially performed.

10. The method for controlling the vehicle cooling system of claim 9, wherein, in the first mode, a coolant temperature is increased to a second predetermined temperature.

11. The method for controlling the vehicle cooling system of claim 9, wherein, in the first mode that is performed again after the fourth mode, a coolant temperature is increased to a third predetermined temperature.

12. The method for controlling the vehicle cooling system of claim 9, wherein the fourth mode is performed until a temperature of the coolant discharged from the EGR cooler reaches a fourth predetermined temperature.

13. The method for controlling the vehicle cooling system of claim 9, wherein the second mode is performed until a coolant temperature reaches a fifth predetermined temperature.

14. The method for controlling the vehicle cooling system of claim 1, wherein the operation of the control valve is performed when an outdoor temperature is greater than a first predetermined temperature and a cooling fan is in a turned-on state.

15. The method for controlling the vehicle cooling system of claim 3, wherein when a coolant temperature is increased to a second predetermined temperature in the first mode and the coolant temperature is increased to a third predetermined temperature in the first mode that is performed again after the fourth mode, the fourth mode is performed until a coolant temperature discharged from the EGR cooler reaches a fourth predetermined temperature, and the second mode is performed until the coolant temperature reaches a fifth predetermined temperature.

16. The method for controlling the vehicle cooling system of claim 15, wherein the second to third predetermined temperatures and the fifth predetermined temperature are gradually increased from the second predetermined temperature to the fifth predetermined temperature.

17. A control system for cooling a vehicle, comprising:

an engine;

an exhaust gas recirculation (EGR) cooler;

an oil cooler;

a heater;

a radiator, wherein the engine, the EGR cooler, the oil cooler, the heater, and the radiator are respectively connected through a coolant line;

a water pump, wherein coolant circulates through the engine, the EGR cooler, the oil cooler, the heater, and the radiator by operation of a water pump; and a controller for controlling a control valve that receives the coolant from the engine and is connected to the oil cooler, the heater, and the radiator, respectively, wherein the controller is configured to:

sense a plurality of driving conditions; and operate the control valve when a cooling mode is required to decrease a temperature within the vehicle based on the sensed driving conditions, wherein the control valve is operated based on a plurality of modes that are adjusted depending on a coolant temperature, wherein one of the plurality of modes is iteratively performed, and wherein in the mode that is iteratively performed, the coolant circulating by operation of the water pump circulated to the EGR cooler without passing through the engine.

18. The system of claim 17, wherein, between the iteratively performed modes, one of modes that circulates the coolant to the oil cooler or the heater or to the oil cooler and the heater, excluding the radiator, is performed.

* * * * *